United States Patent
Shpilyuck et al.

(10) Patent No.: US 11,314,605 B2
(45) Date of Patent: Apr. 26, 2022

(54) SELECTING OPTIMAL DISK TYPES FOR DISASTER RECOVERY IN THE CLOUD

(71) Applicant: EMC IP Holding Company LLC, Hopkinton, MA (US)

(72) Inventors: Boris Shpilyuck, Ashdod (IL); Jehuda Shemer, Kfar Saba (IL); Tomer Kushnir, Ramat Gan (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 96 days.

(21) Appl. No.: 16/983,988

(22) Filed: Aug. 3, 2020

(65) Prior Publication Data
US 2022/0035715 A1 Feb. 3, 2022

(51) Int. Cl.
G06F 11/00 (2006.01)
G06F 11/14 (2006.01)
G06F 11/30 (2006.01)

(52) U.S. Cl.
CPC ...... *G06F 11/1469* (2013.01); *G06F 11/1435* (2013.01); *G06F 11/1451* (2013.01); *G06F 11/1461* (2013.01); *G06F 11/1464* (2013.01); *G06F 11/1484* (2013.01); *G06F 11/3034* (2013.01)

(58) Field of Classification Search
CPC ............. G06F 11/1461; G06F 11/1451; G06F 11/1464; G06F 2201/81; G06F 3/065; G06F 11/1456; G06F 11/1469; G06F 11/1435; G06F 11/1484; G06F 11/3034; G06F 3/0614
See application file for complete search history.

(56) References Cited

U.S. PATENT DOCUMENTS

| | | | |
|---|---|---|---|
| 8,856,522 B2 * | 10/2014 | Grgic | G06F 21/6236 713/166 |
| 10,133,508 B1 * | 11/2018 | Smaldone | G06F 11/14 |
| 10,810,088 B1 * | 10/2020 | Gu | G06F 11/1464 |
| 11,023,330 B2 * | 6/2021 | Kotha | G06F 11/1464 |
| 2012/0089572 A1 * | 4/2012 | Raichstein | G06F 16/174 707/645 |
| 2013/0097304 A1 * | 4/2013 | Asthana | H04L 41/5006 709/224 |
| 2016/0306723 A1 * | 10/2016 | Lu | G06F 11/108 |
| 2017/0270010 A1 * | 9/2017 | Formato | G06F 3/0604 |
| 2019/0317864 A1 * | 10/2019 | Ma | G06F 11/1461 |
| 2020/0042400 A1 * | 2/2020 | Ashokkumar | G06F 11/1469 |
| 2020/0057669 A1 * | 2/2020 | Hutcheson | G06F 3/0619 |

(Continued)

*Primary Examiner* — Loan L. T. Truong
(74) *Attorney, Agent, or Firm* — Staniford Tomita LLP

(57) ABSTRACT

Embodiments for providing automated selection of optimal disk types for virtualized storage by defining a minimum number of backup samples, selecting, if the minimum number of backup samples is not met for a backup operation, a solid state drive (SSD) for a virtual machine (VM) storage for a disaster recovery operation, otherwise selecting a hard disk drive (HDD) for the VM storage. The method further defines a cold HDD threshold (CHT) value and a minimal percentage of backups (PPT) value, and obtains a cold backup count based on the CHT value. It compares a ratio of the cold backup count to an amount of backups (AB) for the disaster recovery operation to the defined PPT value, and if the ratio is greater than the PPT value, it selects the SSD rather than HDD for the VM storage.

20 Claims, 6 Drawing Sheets

(56) References Cited

U.S. PATENT DOCUMENTS

2021/0019188 A1\* 1/2021 Lei ...................... H04L 67/1017
2021/0224168 A1\* 7/2021 Agarwal ............. G06F 9/45558
2021/0240575 A1\* 8/2021 Mulheren ........... G06F 11/1464

\* cited by examiner

SELECTING OPTIMAL DISK TYPES FOR DISASTER RECOVERY IN THE CLOUD

TECHNICAL FIELD

Embodiments are generally directed to data backup and restore processes, and to optimally selecting between HDD or SSD device types for disaster recovery VM storage.

BACKGROUND

Disaster recovery (DR) in large-scale data storage networks involves restoring data from backup storage and is a critical process for organizations. Typically, continuous data protection (CDP) methods are used to automatically save a copy of every change made to the data to provide the ability to restore data to any point in time in the event of hardware failure, system outages, and other significant disruptive events.

A common approach when performing disaster recover from on-premise sites to a cloud network is to create a temporary restore VM (virtual machine) in the cloud that executes the actual disaster recovery tasks. This process creates disks of the same sizes as the customer's protected VM, reads the backup copies data from cloud storage and writes it to the newly created disks, and installs required device drivers on the target VM, and so on. Upon completion of these tasks, the customer's VM can be launched in the cloud with the newly prepared disks.

A key consideration in this process is selecting which types of disks should be used for the recovered VM. Recently, major cloud vendors (e.g., AWS, Azure, etc.) have started to provide different target disk types that are optimal for specific use cases. For example, AWS (Amazon Web Services) provides a general purpose solid state disk (GP SSD) storage media that is suitable for a broad range of transactional workloads, low-latency interactive applications and boot volumes, as well as a cold hard disk drive (HDD) storage that is suitable for large, sequential cold-data workloads with infrequent data access). Other vendors, such as Azure, have corresponding disk types as well. Besides storage capacity and performance characteristics, the price difference between these disk types is also very significant. At present rates of cost, SSD storage is on the order of two to four times more expensive than cold HDD. The basic approach of always using SSD storage because it will suit any workload can become very cost inefficient, especially in large-scale data environments. Letting the customer decide which disk types should be used is not very practical either because the decision should be done for each disk of each VM. In case of large workloads consisting of hundreds or thousands of VMs it is basically impossible to keep track of all the disks and decide intelligently on the appropriate disk type.

What is needed, therefore, is a way to automate the process of selecting the optimal disk types for recovered VMs in the cloud.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Networker, Data Domain, and Data Domain Restorer are trademarks of DellEMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
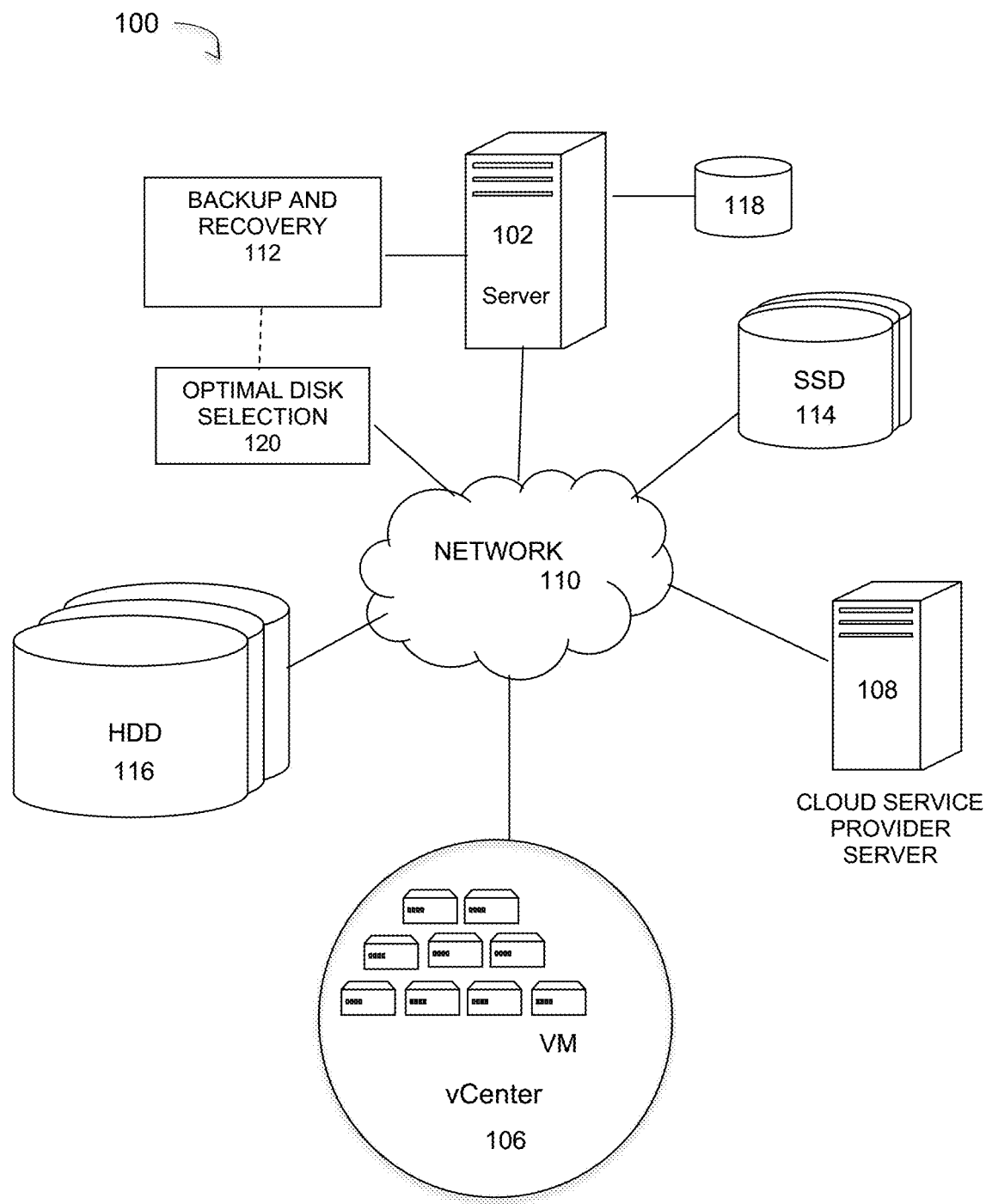
FIG. 1 is a diagram of a large-scale network implementing a data protection process using SSD and/or HDD storage devices, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve automated data storage techniques in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

FIG. 1 is a diagram of a large-scale network implementing a data protection process using SSD and/or HDD storage devices, under some embodiments. As shown in FIG. 1, a network server computer 102 is coupled directly or indirectly to primary and secondary storage devices, such RAID storage 114 or virtual machines (VMs) 106, and to the data source 108 through network 110, which may be a cloud network, LAN, WAN or other appropriate network.

Network 110 provides connectivity to the various systems, components, and resources of system 100, and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud-computing platform. In an embodiment, system 100 may represent a multi-tenant network in which a server computer runs a single instance of a program serving multiple clients (tenants) in which the program is designed to virtually partition its data so that each client works with its own customized virtual application, with each VM representing virtual clients that may be supported by one or more servers within each VM, or other type of centralized network server.

In system 100, virtual machines may be organized into one or more vCenters (virtual centers) 106 representing a physical or virtual network of many virtual machines (VMs), such as on the order of thousands of VMs each. Such VMs may be VMs that store data for one or more data sources. The vCenter 106 or any other grouping of VMs may be included within the cloud network 110 or in a network accessible to the cloud network.

In an embodiment, cloud network 110 may be a private network or it may be a public network provided by a third-party cloud service provider (CSP) 108. In this case, at least part of the infrastructure of network 110, such as servers, routers, interfaces and so on are provided to users such as storage server 102 as an IaaS (Infrastructure as a Service), SaaS (Software as a Service), PaaS (Platform as a Service), or other type of arrangement. CSP's typically provide service under a service level agreement (SLA) that establishes the terms and costs to use the network and transmit/store data specifies minimum resource allocations (e.g., storage space) and performance requirements (e.g., network bandwidth) provided by the provider. The cloud service provider server 108 may maintained be any company such as Amazon, EMC, Apple, Cisco, Citrix, IBM, Google, Microsoft, Salesforce.com, and so on. Depending on implementation, each cloud provider may show up as a cloud tier inside the file system for the user, such as the Data Domain file system. The cloud tier will have one or more cloud units that are used for data migration and storage using migration, copying, duplication, long-term retention (LTR), and other processes.

The data generated or sourced by system 100 may be stored in any number of persistent storage locations and devices, such as local client storage, server storage (e.g., 118), or network storage (e.g., 114, 116), which may at least be partially implemented through storage device arrays, such as RAID (redundant array of independent disks) components. In an embodiment network 100 may be implemented to provide support for various storage architectures such as storage area network (SAN), network-attached storage (NAS), or direct-attached storage (DAS) that make use of large-scale network accessible storage devices 114, such as large capacity disk (optical or magnetic) arrays. The storage may be virtualized in that the target storage devices represent disk-based targets implemented through virtual machine technology. These storage devices 114 and 116 may provide the actual hardware storage for VM based storage for the VMs in system 100.

In an embodiment, system 100 includes a backup server 102 that executes a backup and recovery process 112 to backup and restore data in the system. A data protection process may be used to copy a full replica of selected data to an allocated replica volume in the system. This process may be a continuous disaster recovery process that utilizes snapshot backups as recovery points to create point-in-time copies of a replica of the data to be stored by the primary storage media, such as SSDs 114 or HDDs 116. The replica thus comprises a complete point-in-time copy of the data stored in the storage media of the systems and which may be organized as files, folders, directories, volumes, etc. for data sources or one more protected computers. Other similar backup and restore processes or software products that backup source data to a storage location for later recovery to the original or different data storage may also be used In an embodiment, system 100 may represent part of a Data Domain Restorer (DDR)-based deduplication storage system, and se 102 may be implemented as a DDR Deduplication Storage server provided by EMC Corporation. However, other similar data storage systems are also possible. Although many different types of storage media may be provided, in a cloud-based network with VM storage, the primary storage media in system is generally provided by SSD devices 114 and HDD devices 116 depending on system configuration and customer requirements.

Cloud service providers usually offer a range of options that allow a customer to balance storage performance versus cost for their workloads. These options are divided into two major categories: SSD-backed storage for transactional workloads, such as databases and boot volumes (where performance depends primarily on IOPS), and HDD-backed storage for throughput intensive workloads, such as log processing (where performance depends primarily on MB/s throughput). As is known, a solid state drive is a storage device that uses solid state circuit assemblies as memory to store data persistently, as opposed to electromechanical drives (e.g., HDDs). Solid state drives are typically faster than HDDs, but are usually significantly more expensive per unit of storage.

As stated previously, selecting the optimal disk type for VM storage targets is a complex and important task. Selecting the optimal disk type requires the workload owner to know the usage details of every disk of every VM. For a large workload consisting of hundreds or thousands VMs this is not practical, and automating this process is not trivial either. It is possible to install an agent in every VM that will monitor the disks usage and will decide if disk is frequently accessed or not, but this can have negative effect on the performance and can also complicate the whole setup process on the production (source) site. There are also additional technical issues that need to be taken into account. For example, cold HDD disks cannot be used as boot disks even if for a specific VM boot disk is not very frequently accessed. All those details make the process of defining the optimal disk type to be complex.

Because of cost considerations, selecting the optimal disk type is a very important consideration for most enterprises and organizations. Various different types of disk types are often offered by cloud providers and their costs can vary greatly. For example, in AWS systems, the SSD based disks are four times more expensive than the HDD based disks of the same size, and in Azure, they may be more than twice as expensive) The yearly difference in price for a single 1 TB disk (in AWS) can thus be on the order of $1228 versus $307, and if the workload contains hundreds or thousands VMs, the total cost savings of HDD versus SSD can be very significant.

Even within each category of HDD versus SSD, different disk sub-types may also be available. For example, SSD disks may be provided as high performance volumes or general purpose volumes. The highest performance SSD volumes are usually designed for latency-sensitive transactional workloads (e.g., I/O intensive database applications), while general purpose SSD volumes balance price performance for a wide variety of transactional workloads (e.g., boot volumes, low-latency applications, test/development). Similarly, HDD storage may be provided as throughput-optimized HDD, which are low-cost HDD volumes designed for frequently accessed, throughput intensive workloads (e.g., big data, data warehouses, log processing), or cold HDD storage, which are lowest cost HDD volumes designed for less frequently accessed workloads (e.g., colder data requiring fewer scans per day). For purposes of description, embodiments provide automated selection between SSD and HDD as the two main categories of storage devices. However, it should be noted that alternative embodiments may include further categorization and selection among one or more sub-types within each of these two main categories. Thus, the term "SSD" is used to refer to any type of high performance SSD device or sub-type, and the term "HDD" is used to refer to cold HDD storage or regular HDD storage.

As shown in FIG. 1, system 100 includes an optimal disk selection process 120 that automates the selection of optimal disk type by using information gathered from VM configuration and backup statistics.

Figure 2:
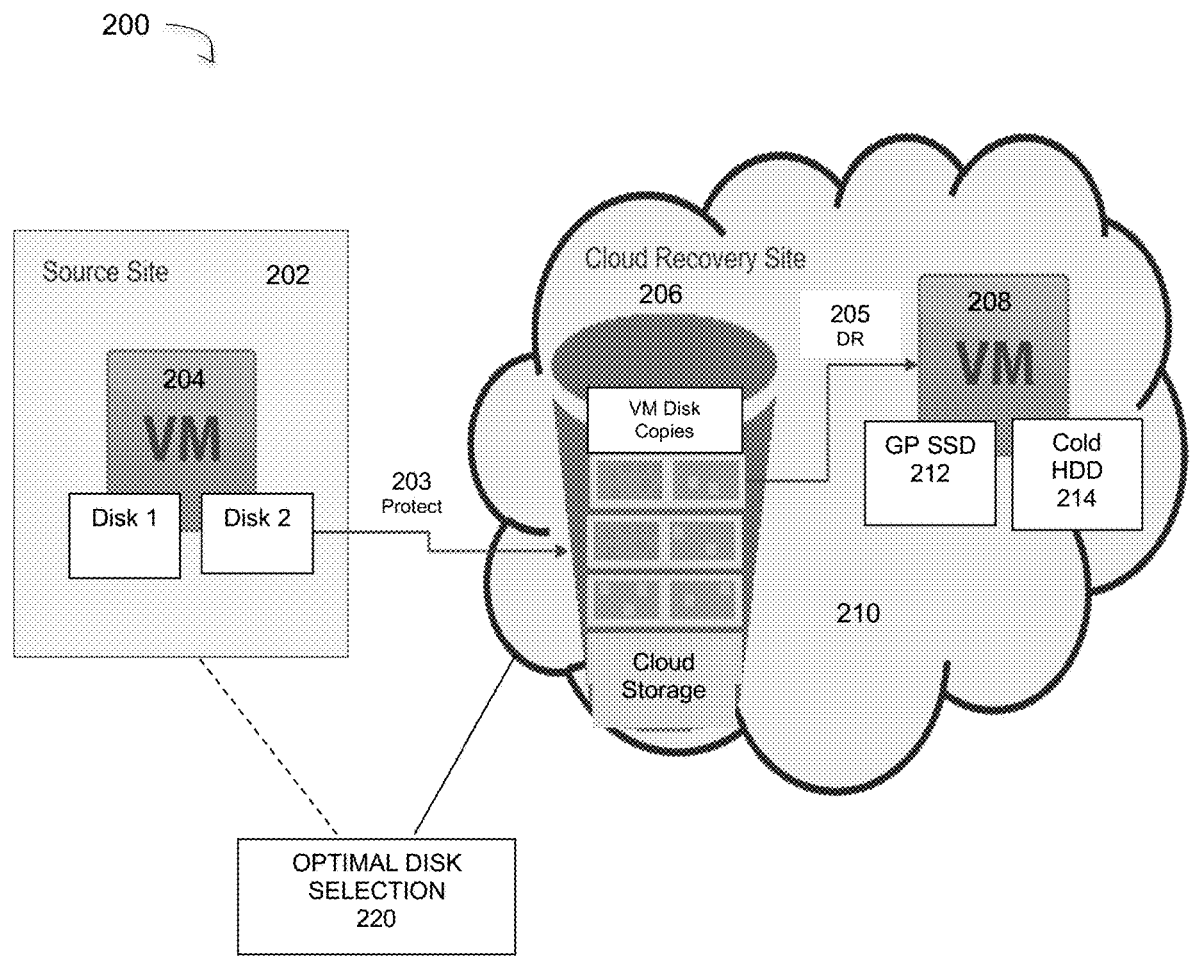
FIG. 2 illustrates a cloud network system implementing an optimal disk selection process, under some embodiments.

FIG. 2 illustrates a cloud network system implementing an optimal disk selection process, under some embodiments. As shown in system 200, a source site 202 comprises a VM 204 that stores data in a number of disks, such as denoted Disk 1 and Disk 2 (up to possibly Disk N). The source site 202 is also referred to as an "on premise" location. Through a data protection process 203 (such as executed by process 112), the data from the source 202 disk storage is backed up to a recovery site 206 in cloud network 210. The cloud recovery site 206 stores the VM 204 disk copies in cloud storage media. In a disaster recovery (DR) operation 205, the backed up data is moved to a target VM 208, which accesses the two main storage types SSD 212 (e.g., general purpose SSD) and HDD 214 (e.g., cold HDD).

As shown in FIG. 2, the cloud recovery system relies on copying data from the source site (on-premise) disks to cloud storage during a backup operation and then to cloud-based VM storage during a disaster recovery operation. While it is possible to extract production (source site) VM 204 disk configuration information (for Disk 1 and Disk 2), it is not clear that the production VM disk types are selected in the same way needed in the cloud 210. The reasons for this may be that the on-premise disk types may not correlate to the cloud options, and/or that the on-premise tradeoffs regarding price/performance balance is different. The original source site disks may be any mix of HDD, SSD, or other storage devices, but the ultimate DR VM disks are either HDD or more expensive SSD devices, and as stated above, simply choosing SSD devices as target storage is usually not economically feasible.

To overcome these and other disadvantages, system 200 includes an automated optimal disk selection process 220, which uses certain disk configuration information as hints or relevant information to select the best option with respect to HDD or SSD disk storage type. For the embodiment of FIG. 2, the optimal disk selection process 220 may be executed by the cloud recovery site as a cloud-based application. Alternatively or in addition, it may be executed by the source site 202, such as by backup server 102, as a locally executed application.

Virtual environments such as system 200 are based on a hypervisor (e.g., vSphere/HyperV, etc.) that provides an API (application program interface) for obtaining disk and disk controller settings. Such an API can typically be used to get the disk types of every VM in the system, and this information [VM, disk, disk type] can be saved with each backup as additional backup metadata. During a VM disaster recovery process 205, this metadata will be inspected, and certain corresponding threshold values will be modified for every VM disk. In an embodiment, the optimal disk selection process 220 is used to modify certain of these thresholds, as defined below.

The process 220 uses an algorithm operating on certain parameters for defining the optimal disk type among available HDD and SSD disk types. Table 1 below lists the parameters used by process 220, under some embodiments.

TABLE 1

| PARAMETER | DESCRIPTION |
| --- | --- |
| MNP | Minimum Sample Size (number of probes) |
| CHT | Cold HDD Threshold |
| PPT | Positive Probes Threshold |

As shown in Table 1, the three configurable parameters are the minimum number of probes (MNP), the cold HDD threshold (CHT), and the positive probes threshold (PPT). A statistical method is used in process 220, and as such, a minimum sample size (MNP) is required to make sure that the threshold numbers are statistically significant.

With regard to the MNP parameter, the minimum number of probes corresponds to the minimum number of backup samples that is required to be processed in order to define the disk type. If the disaster recovery operation is attempted before the MNP threshold is reached, the default disk type will be used. In an embodiment, the default disk type is general purpose SSD to ensure a maximum amount of performance for any given scenario.

The CHT parameter is the maximum percentage (or some fixed percentile) of the disk data that is changed in a single backup. If the percentage of changed data in a backup is less than this CHT threshold, this backup operation will contribute to the final decision to treat the disk as cold HDD (and vice versa).

The PPT threshold is minimum percentage of probes (backups) that their changed data has not exceeded the CHT. If the final result exceeds the PPT threshold, the selected disk type will be defined as cold HDD.

The parameters shown in Table 1 are provided for example, and other or additional parameters and their associated values or ranges may also be used depending on system requirements and configurations.

Figure 3:
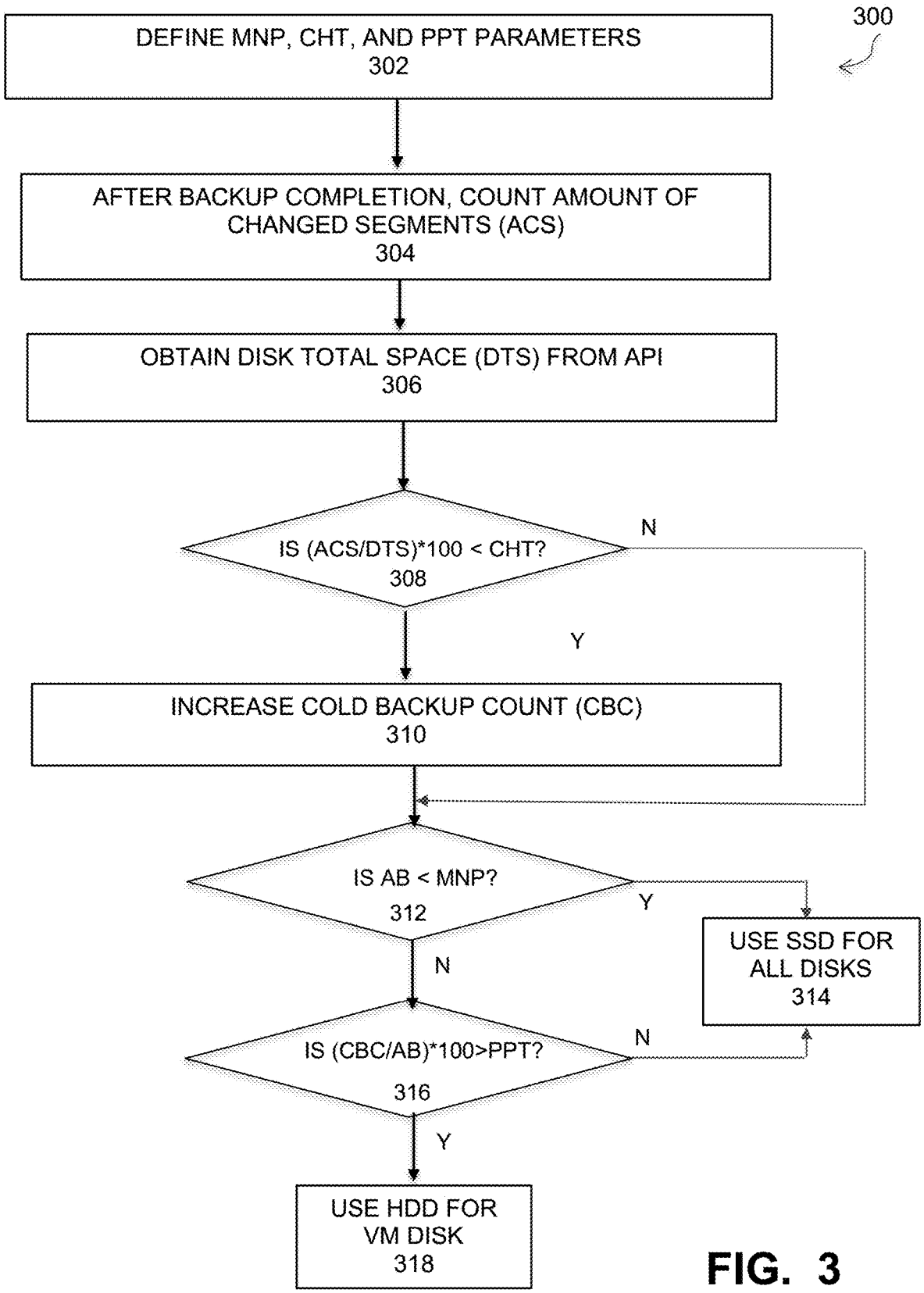
FIG. 3 is a flowchart that illustrates a method of automatically selecting optimal disk types for disaster recovery, under some embodiments.

FIG. 3 is a flowchart that illustrates a method of automatically selecting optimal disk types for disaster recovery, under some embodiments. Process 300 of FIG. 3 starts (302) by defining the three parameters, MNP, CHD, and PPT as shown in Table 1.

Upon completion of a backup of a non-boot disk, the system will count the amount of changed segments (ACS) in the data saveset, 304. From the hypervisor API configuration information, the disk total size (DTS) is known from the [VM, disk, disk type] information. The DTS is obtained from the API, 306. The ACS and DTS information is then compared to the cold HDD threshold in decision block 308. In an embodiment, a normalized ratio is used. Thus, if ACS/DTS*100<CHT, then in step 310, a cold backups count (CBC) will be increased by one: CBC=CBC+1. The CBC count will always be 0 for a boot disk.

Upon a disaster recovery operation, the process determines in decision block 312 whether or not the amount of backups (AB) is less than the MNP threshold value. This comparison is performed to ensure that the minimum number of backup samples that is taken to select the proper disk type. If the AB value is less than the MNP threshold, then the process will use the SSD (e.g., GP SSD) as the default disk type for all the VM's disks, 314. If there are enough backup samples relative to the MNP threshold, the process will then be determined in decision block 316 whether or not the ratio of cold backup count to the amount of backups greater than the positive probes threshold. In an embodiment, a normalized ratio is used. Thus, if for every VM disk, CBC/AB*100>PPT, the process uses the cold HDD disk type for the DR saveset for the VM, 318; otherwise, it uses the SSD disk type, 314.

In an embodiment, the optimal disk selection process 220 can be configured to distinguish and process additional service levels and production site configuration information. Service levels can be distinguished on the basis of speed or quality, such as high, medium, low, or any other appropriate scale. For purposes of description, and in an example embodiment, there are three service levels: fast, standard, and cold. These three service levels are used to modify the CHT and PPT parameter threshold definitions. In general, the definition of MNP (minimum number of samples needed) stays the same regardless of the service level.

Figure 4:
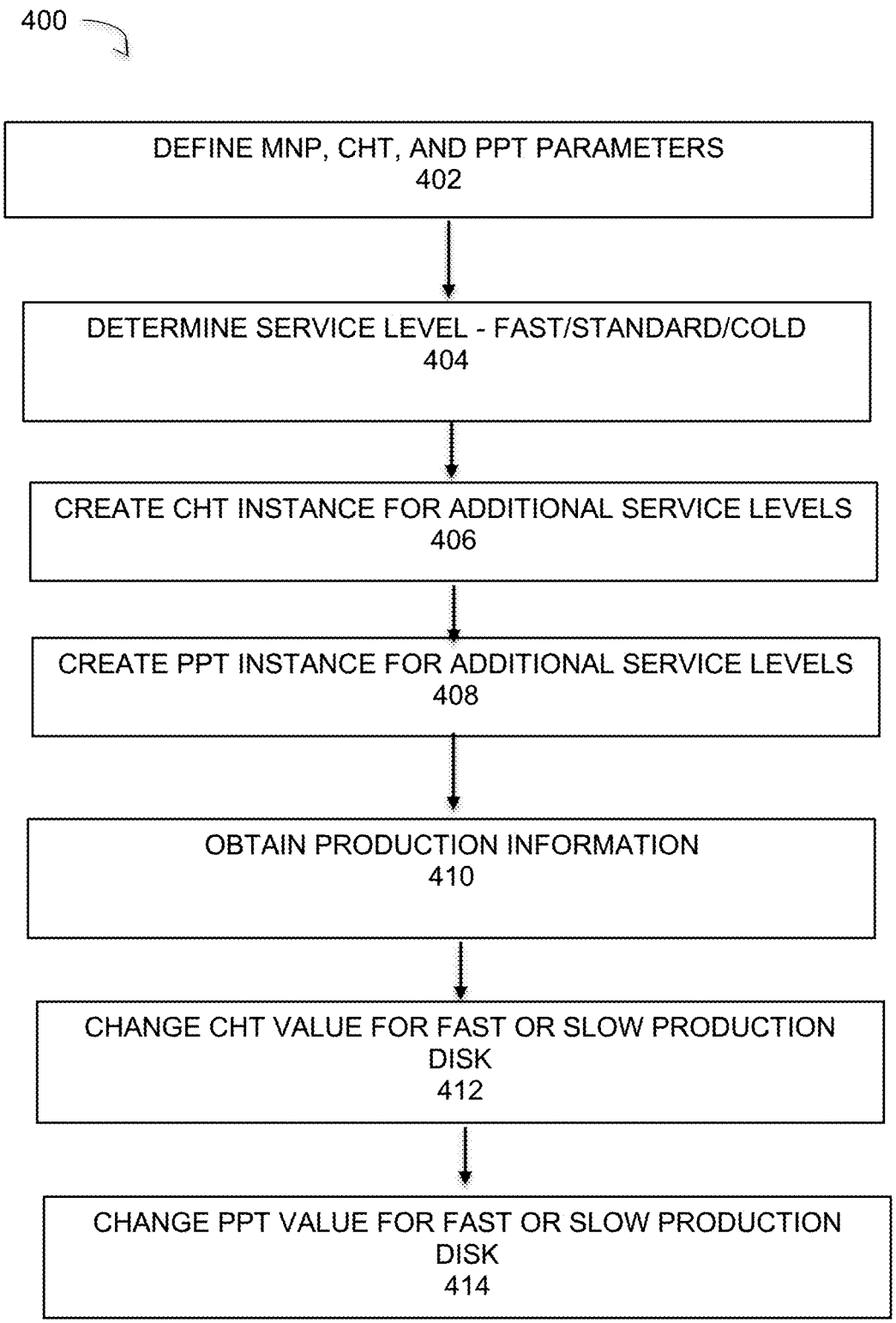
FIG. 4 illustrates a process of selecting an optimal disk for disaster recovery using different service levels, under some embodiments.

FIG. 4 illustrates a process of selecting an optimal disk for disaster recovery using different service levels and configuration information, under some embodiments. As shown in FIG. 4, process 400 starts with the initial definition of the MNP, CHT, and PPT parameters, 402. The different service levels are then determined, 404. For the example embodiment, three service levels are defined: fast, standard, and cold. Other amounts of service levels or different service levels may also be defined. The process then creates an instance of the CHT and PPT parameters for each service level, while leaving the MNP parameter alone. Thus, in step 406, the process creates a CHT instance for each of the additional service levels, such as fast and cold, if the initial service level is standard. Likewise, in step 408, the process creates a PPT instance for each of the additional service levels. The different instances creates three different values for each of the CHT and PPT parameters based on the service level. The service level generally represents the amount of activity that is experienced or expected per disk level. For example, the CHT threshold will be set higher the more activity that is expected per disk level. The PPT value may stay the same or vary according to the statistical confidence level.

The service levels basically allow adjustments of the parameters per the expected activity. Thus, if it is known that the activity level is high in a specific system, the system may raise the CHT value to allow more accurate calculations for this system. Table 2 illustrates an example of the CHT and PPT parameter instances for each of the example service levels.

TABLE 2

|  | CHT | PPT |
| --- | --- | --- |
| FAST | 15 | 12 |
| STANDARD | 10 | 10 |
| COLD | 5 | 8 |

Besides the service level, the production site (on-premise) configuration information may also be used to modify the CHT and PPT values. This information may pertain to the types of disks originally used in the source site 204. Thus, in step 410 of FIG. 4, the production information is obtained. The CHT value is then changed depending on the production information, step 412, as is the PPT value, step 414. For example, if the production disk is a fast SSD device, the PPT threshold may be increased for that disk type, which will then increase the probability of the target disk in the DR site being selected to be a fast SSD disk.

Figure 5:
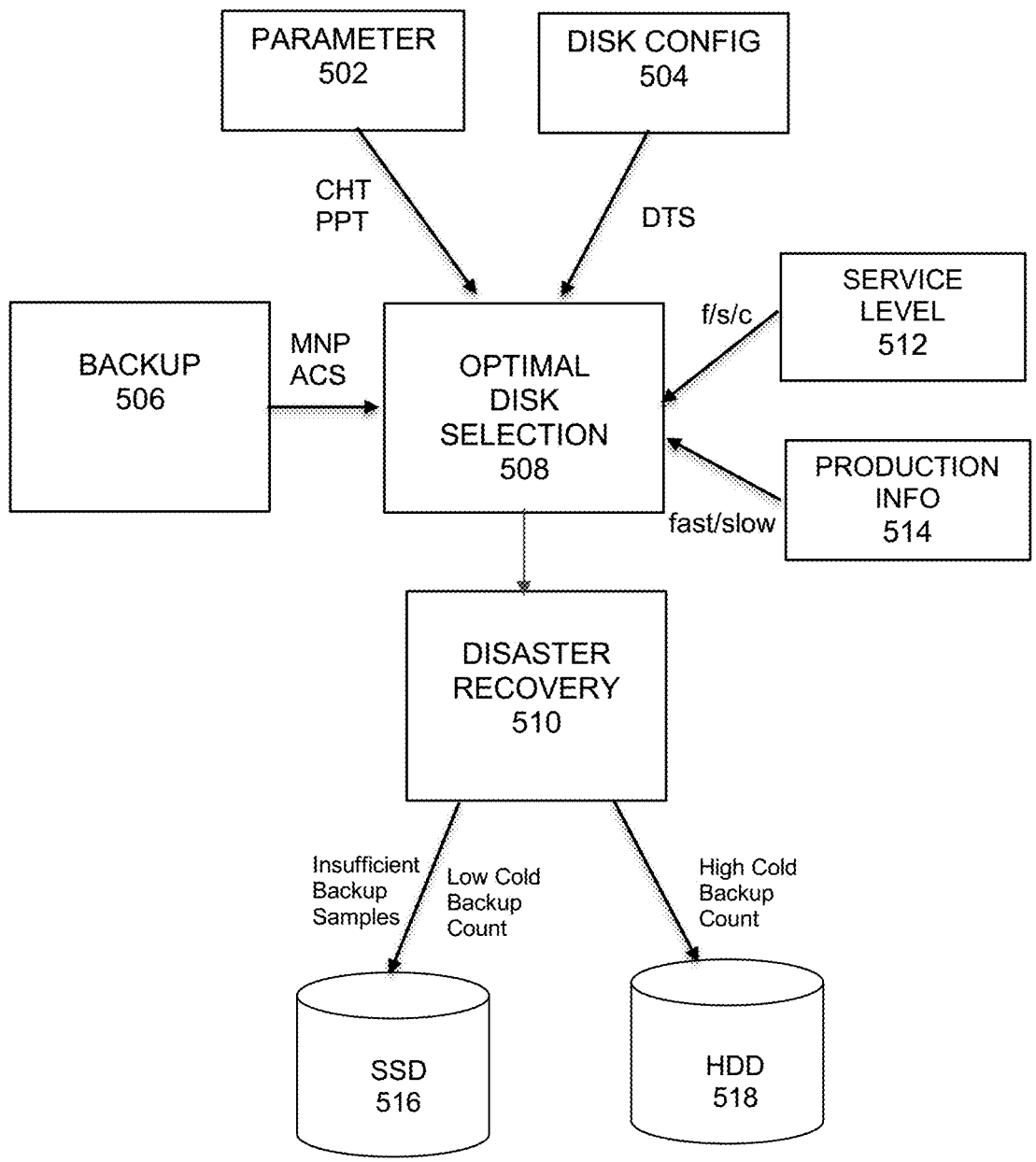
FIG. 5 is a block diagram of a system for optimal selection of disk types for disaster recovery, under some embodiments.

FIG. 5 is a block diagram of a system for optimal selection of disk types for disaster recovery, under some embodiments. As shown in FIG. 5, system 500 comprises a backup component or process 506 that backs up data from a source site 202 VM to a cloud recovery site 206. Within the cloud network, a disaster recovery component or process 510 copies the data to a target VM that may be embodied in either SSD device 516 or a HDD device 518 depending on the selection made by optimal disk selection component 508. The optimal disk selection component 508 receives and processes different data items, such as parameters and service level/production information, as described above. Thus, in system 500, the optimal disk selection component 508 receives the MNP and ACS information from the backup process 506. It receives the CHT and PPT parameters from the parameter definitions 502, and the DTS information from the disk configuration API 504. It may also receive the service level (fast/standard/cold) 512 and the production configuration (e.g., fast or slow production disk) from the appropriate interfaces.

Based on the algorithmic equations provided above for processing the various parameters and system information, where the parameter values may be set by certain instances based on service level 512 or revised based on the production configuration 514, the appropriate target device type will be selected. In general terms, the SSD device 516 will be selected if the number of backup samples (MNP) is too low (insufficient samples) as determined in step 312 of FIG. 3. In this case, the SSD is selected as the default disk in the event of insufficient sample size. The SSD device type is also selected in the case of a cold backup count that is less than the PPT threshold, as determined in step 316 of FIG. 3. Thus, for a low cold backup count, the SSD 516 type is selected and for a high cold backup count, the HDD 518 type is selected.

Embodiments of the optimal disk selection process 220 automate the selection of the virtual machine disk types at the cloud recovery site and makes the overall disaster recovery solution more cost effective. In most applications, such a cost savings will continue through the whole life cycle of the recovered VM (unlike with some optimizations that target DR process itself) making this optimization even more significant.

Although embodiments are described for optimal disk selection between SSI) and HDD devices in a DR system, it should be noted that other similar data storage devices may be used depending on system configuration and available storage types. Generally, one type of storage will e higher performance but more expensive (e.g., SSI)) than the alternative storage (e.g., HDD and embodiments of the automated selection process described herein ay be used to select between any two or more types of storage devices based on such cost, performance, and availability tradeoffs.

As described above, in an embodiment, system 100 include certain processes that may be implemented as a computer implemented software process, or as a hardware component, or both. As such, it may be an executable module executed by the one or more computers in the network, or it may be embodied as a hardware component or circuit provided in the system. The network environment of FIG. 1 may comprise any number of individual client-server networks coupled over the Internet or similar large-scale network or portion thereof. Each node in the network(s) comprises a computing device capable of executing software code to perform the processing steps described herein.

Figure 6:
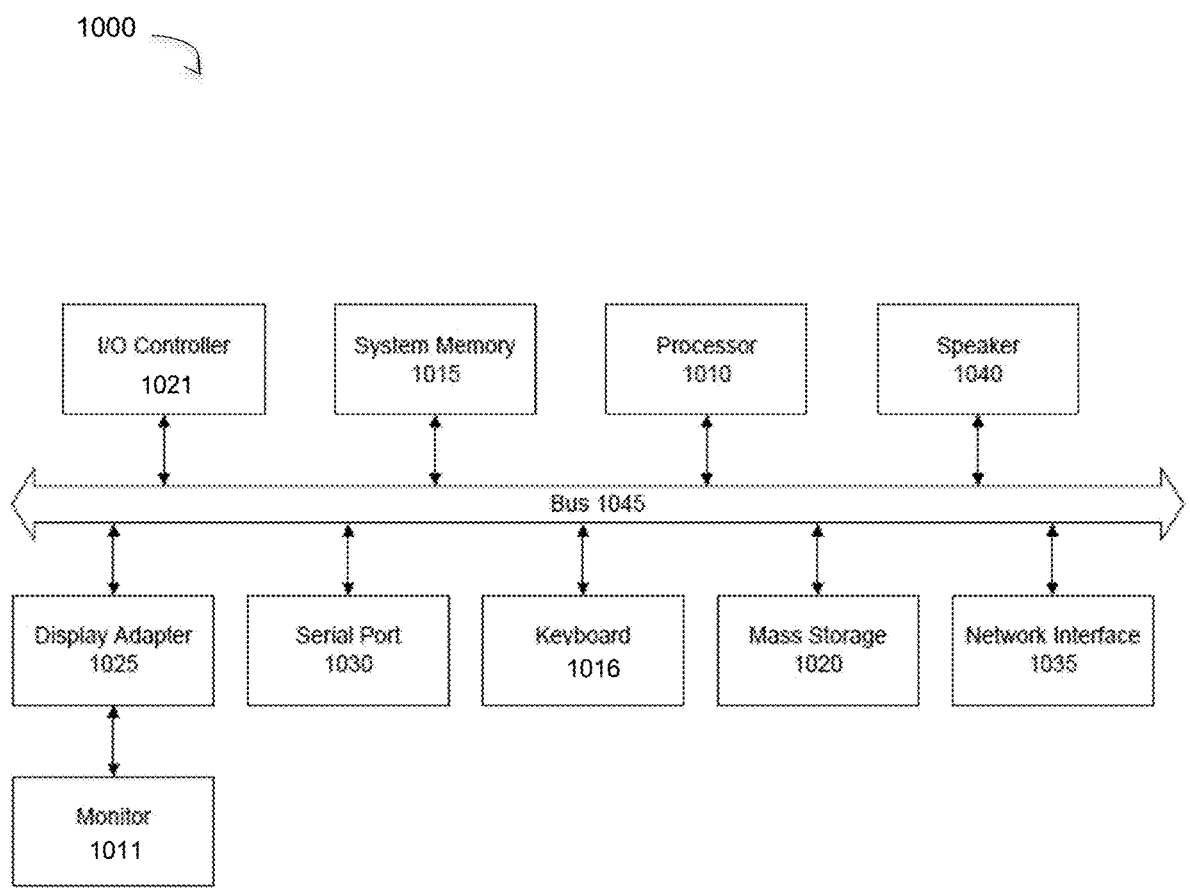
FIG. 6 is a block diagram of a computer system used to execute one or more software components of a system for continuous data protection using smart SSD devices, under some embodiments.

FIG. 6 is a block diagram of a computer system used to execute one or more software components of a system for automatically selecting optimal disk storage for disaster recovery, under some embodiments. The computer system 1000 includes a monitor 1011, keyboard 1016, and mass storage devices 1020. Computer system 1000 further includes subsystems such as central processor 1010, system memory 1015, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1000. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 shown in FIG. 6 is an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software. An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Although certain embodiments have been described and illustrated with respect to certain example network topographies and node names and configurations, it should be understood that embodiments are not so limited, and any practical network topography is possible, and node names and configurations may be used. Likewise, certain specific programming syntax and data structures are provided herein. Such examples are intended to be for illustration only, and embodiments are not so limited. Any appropriate alternative language or programming convention may be used by those of ordinary skill in the art to achieve the functionality described.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of providing automated selection of optimal disk types for virtualized storage, comprising:
    defining a minimum number of backup samples;
    selecting, if the minimum number of backup samples is not met for a backup operation, a solid state drive (SSD) for a virtual machine (VM) storage for a disaster recovery operation, otherwise selecting a hard disk drive (HDD) for the VM storage;
    defining a cold HDD threshold (CHT) value and a minimal percentage of backups (PPT) value;
    obtaining a cold backup count based on the CHT value;
    comparing a ratio of the cold backup count to an amount of backups (AB) for the disaster recovery operation to the defined PPT value; and
    if the ratio is greater than the PPT value, selecting the SSD for the VM storage, otherwise selecting the HDD for the VM storage.

2. The method of claim 1 wherein the virtualized storage is maintained in a cloud network.

3. The method of claim 2 wherein the backup operation copies data from a VM disk of a production site to a cloud recovery site in the cloud network.

4. The method of claim 3 further comprising using production site information including a disk speed of the production site VM disk to modify at least one of the defined PPT value.

5. The method of claim 3 further comprising further comprising defining a plurality of service levels based on an amount of actual or expected backup activity of the backup operation.

6. The method of claim 5 further comprising:
    creating a different CHT value instance for each service level; and
    creating a different PPT value instance for each service level.

7. The method of claim 1 further comprising:
    counting an amount of changed segments (ACS) for the backup operation;
    obtaining a disk total size (DTS); and
    increasing the cold backup count if a ratio of ACS to DTS is less than the CHT value.

8. The method of claim 7 wherein the DTS is obtained through a hypervisor API (application program interface) from disk and disk controller settings of every VM in the system, and that are saved in the backup operation as additional backup metadata.

9. The method of claim 7 wherein determining whether the ratio of ACS to DTS is less than the CHT value comprises calculating: (ACS/DTS)*100>CHT.

10. The method of claim 7 wherein a step of determining if the ratio is greater than the PPT value comprises calculating: (CBC/AB)*100>PPT.

11. A computer-implemented method of providing automated selection of optimal disk types for virtualized storage, comprising:
    defining a minimum number of probes (MNP) parameter value, a cold hard disk drive (CHT) threshold value, and a positive probes threshold (PPT) value;
    counting, upon completion of a backup task of a non-boot disk in a source site, an amount of changed segments (ACS);
    obtaining, from an application program interface (API), a disk total size (DTS);
    determining if a ratio of ACS to DTS is less than the CHT value, and if so, increasing a cold backup count (CBS) by one;
    determining, upon a disaster recovery request, if the amount of backups (AB) is less than the MNP value, and if so, using a solid state disk (SSD) type memory storage for the disaster recovery; and
    further determining if a ratio of CBC to AB is greater than the PPT value, and if so using a hard disk drive (HDD) type memory storage for the disaster recovery, otherwise using the SSD type memory storage for the disaster recovery.

12. The method of claim 11 wherein determining if the ratio of ACS to DTS is less than the CHT value comprises calculating: (ACS/DTS)*100>CHT.

13. The method of claim 11 wherein a step of determining if the ratio of CBC to AB is greater than the PPT value comprises calculating: (CBC/AB)*100>PPT.

14. The method of claim 11 wherein the virtualized storage is maintained in a cloud network, and wherein the backup operation copies data from a VM disk of a production site to a cloud recovery site in the cloud network.

15. The method of claim 11 further comprising:
    using production site information including a disk speed of the production site VM disk to modify at least one of the defined PPT value; and
    defining a plurality of service levels based on an amount of actual or expected backup activity of the backup operation.

16. The method of claim 15 further comprising:
    creating a different CHT value instance for each service level; and
    creating a different PPT value instance for each service level.

17. The method of claim 11 wherein the DTS is obtained through a hypervisor API (application program interface) from disk and disk controller settings of every virtual machine in the system, and that are saved with each backup as additional backup metadata.

18. A system providing automated selection of optimal disk types for virtualized storage, comprising a processor executing software program code configured to perform a method comprising:

defining a minimum number of backup samples;
selecting, if the minimum number of backup samples is not met for a backup operation, a solid state drive (SSD) for a virtual machine (VM) storage for a disaster recovery operation, otherwise selecting a hard disk drive (HDD) for the VM storage;
defining a cold HDD threshold (CHT) value and a minimal percentage of backups (PPT) value;
obtaining a cold backup count based on the CHT value;
comparing a ratio of the cold backup count to an amount of backups (AB) for the disaster recovery operation to the defined PPT value; and
if the ratio is greater than the PPT value, selecting the SSD for the VM storage, otherwise selecting the HDD for the VM storage.

19. The system of claim 18 wherein the virtualized storage is maintained in a cloud network, and wherein the backup operation copies data from a VM disk of a production site to a cloud recovery site in the cloud network.

20. The system of claim 19 wherein the method further comprises:
using production site information including a disk speed of the production site VM disk to modify at least one of the defined PPT value;
defining a plurality of service levels based on an amount of actual or expected backup activity of the backup operation;
creating a different CHT value instance for each service level; and
creating a different PPT value instance for each service level.

* * * * *